May 27, 1947.  W. A. RAY  2,421,084
ELECTRIC MOTOR CONTROL SYSTEM
Filed June 9, 1944
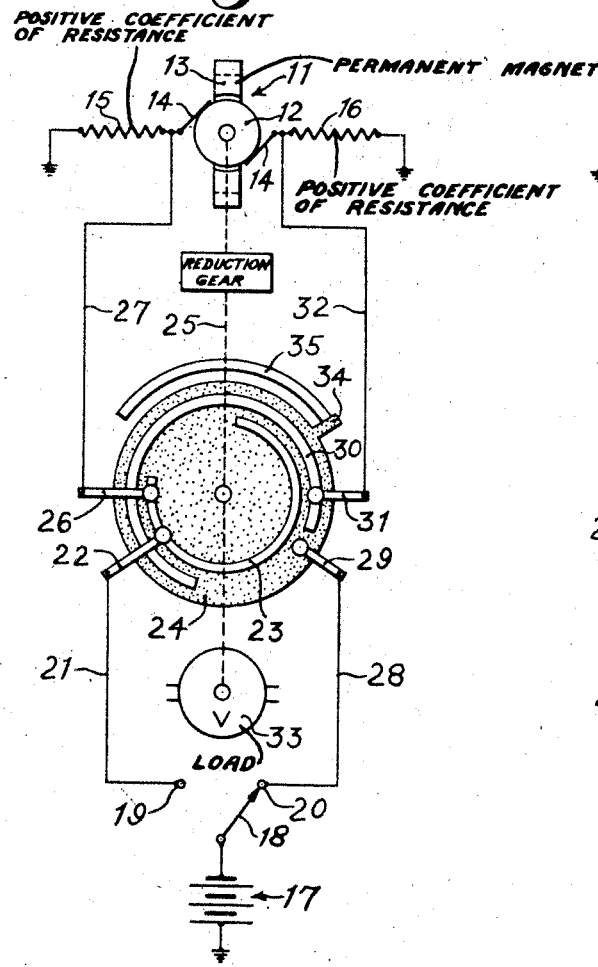
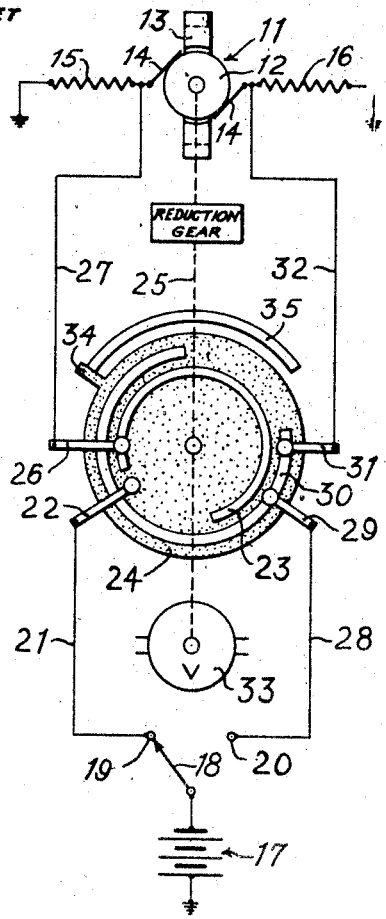
Inventor
WILLIAM A. RAY.
By
John F. Rouse,
Attorney Patented May 27, 1947

2,421,084

UNITED STATES PATENT OFFICE 2,421,084

ELECTRIC MOTOR CONTROL SYSTEM

William A. Ray, Los Angeles, Calif., assignor to General Controls Co., a corporation Application June 9, 1944, Serial No. 539,489

7 Claims. (Cl. 172—239)

My present invention relates to electric-motor control systems; and particularly to a system for controlling the operation and reversal of a direct-current motor of the type having a unidirectional field and an armature winding rotatable in the field in opposite directions in accordance with the polarity of the current passing through it.

An object of this invention is to provide a system, including a motor of the character described, whereby full control of the motor can be effected by operation of a simple switch of the single-pole double-throw type.

Another object is to provide a motor control system which includes means for effecting dynamic braking of the motor, the braking means being automatically effective when passage of current through the armature winding is interrupted.

The motor control system of this invention, while obviously not so limited, has particular utility in connection with the operation of fluid control valves in aircraft. When the valve is employed for controlling supply of fuel to the engine of an aircraft, it is sometimes very important that control of operation of the valve be instantaneously effective. To cite an example: if the pilot of the aircraft, believing that an emergency landing is imminent, should initiate closing of the valve—and a moment later, seeing a chance to continue flight, should attempt to reverse the operation of the valve—the response of the valve-operating mechanism should be instantaneous in order to prevent possible stalling of the engine. However, in an arrangement commonly employed in aircraft, the valve is operated by an electric motor through switching mechanism (additional to a manually-operated starting switch) which maintains operation of the valve in the direction selected by the manual switch until such operation is complete, whereupon the motor is automatically stopped by the switching mechanism. The period of operation of this valve may be of several seconds duration, and since the manual switch is ineffective during that period, there may be established a dangerous condition such as might, for example, cause undesired stoppage of the engine. It is therefore an object of this invention to avoid such deficiency by providing a system, adapted for the control of an electric-motor-operated valve or similar device, which system includes means for maintaining operation of the device after such operation is initiated by a manual switch and for stopping the device when the selected operation is complete, but which is so arranged that movement of the manual switch to an opposite position during operation of the device effects substantially immediate reversal of operation.

Other objects and advantages of the invention will be found in the description, the drawing, and the claims; and, for full understanding of the invention, reference is to be had to the following detailed description and accompanying drawing, wherein:

Figure 1 is a diagrammatic view of a motor control system embodying the invention; and Figure 2 is a view identical with that of Fig. 1 except that the parts are here shown in moved positions.

In the drawing, the numeral 11 indicates a direct-current motor comprising a rotor or armature winding 12 which is mounted for rotation in the field of a permanent magnet 13. The ends of the armature winding are connected, through the usual commutator arrangement (not shown) and brushes 14, respectively to the inner ends of a pair of resistors 15 and 16. The outer ends of these resistors, being grounded as indicated, are effectively connected in common to the grounded lower terminal of a source of direct current 17. Connected to the other terminal of the source is a manually-operable switch arm 18 which co-operates with a pair of contacts 19 and 20. Contact 19 is connected by a wire 21 to a contact finger 22 which (as seen in Fig. 1) slides on a conducting segment 23 carried by an insulating disk 24 which (as indicated by the broken line 25) is rotatably driven, through the reduction gear indicated by the legend, by the rotor or armature winding 12. Also sliding on the segment 23 is another contact finger 26 which is connected by a wire 27, through left-hand brush 14, to one end of the armature winding 12. In a similar manner, the other contact 20 is connected by wire 28 to contact finger 29 which (as seen in Fig. 2) slides on another conducting segment 30 carried by disk 24. Also sliding on the segment 30 is another contact finger 31 which is connected by wire 32, through right-hand brush 14, to the other end of the armature winding 12. Operatively connected (as indicated by line 25) to disk 24 is a control device or fluid control valve 33. Rotation of disk 24 is limited by engagement of an arm 34, projecting from the disk, with an arcuate stop member 35; however, it is to be understood that suitable stop means associated with the control device 33 could serve the same purpose.

To facilitate understanding of the motor control system of this invention, it will first be contered independent of the automatic circuit-maintaining and -breaking means associated with disk 24, i. e., it will be assumed that the disk and these means are omitted and that the contact fingers 31 and 33 are permanently interconnected so that the circuit between contact 19 and the left-hand end of the armature winding 12 is continuous, and likewise that contact fingers 29 and 31 are so interconnected that there is a continuous circuit between contact 20 and the other end of the armature winding. With the switch arm 18 in engagement with contact 20, as shown in Fig. 1, current flows from the source 17 through the armature winding 12 and resistor 16 back to the source, so that the armature winding rotates; current also flowing in a parallel circuit through resistor 15. If the switch arm is moved to an open position out of engagement with contacts 19 and 20, current flow through the system is interrupted; the armature winding, due to its momentum, tending to continue to rotate, but in so doing a counter electromotive force, due to the field of the permanent magnet 13, is produced in the winding, and since the winding is effectively shorted through resistors 15 and 16, the resultant flow of reverse current through the winding rapidly brings it to rest.

The degree of dynamic braking of the motor, effected as described above, is dependent mainly upon the values of the resistors 15 and 16—the lower the resistance of the resistors, the more effective is the braking. The resistors preferably have similar values, and if these values are low, the amount of current flowing (during normal operation of the motor) through the one of the resistors not in series with the armature winding (resistor 15, in the circuit of Fig. 1) will be relatively great; but the amount of current thus consumed (and which serves no useful purpose) is not important when the motor is operated only during brief periods. If it is desired to conserve current, as when the motor is to be operated during relatively long periods, the resistors 15 and 16 may be constructed of material, such as nickel wire, having a high positive temperature coefficient of resistivity; the wire being of such fineness that the one of the resistors not in series with the armature winding becomes heated to a considerable degree by the flow of current so that its resistance is then increased but is rapidly reduced when the flow of current is interrupted.

Still referring to the basic motor-control system (independent of the switching means associated with disk 24), when switch arm 18 is moved to the position shown in Fig. 2 the flow of current through armature winding 12 will then be in an opposite direction, i. e., from the source through the winding and resistor 16, and back to the source; resistor 15 being connected directly to the source in a parallel circuit. It is thus seen that, under the control of a simple single-pole double-throw switch, and without the requirement for auxiliary means such as a relay, the motor can be operated in reverse directions; and, when the switch is opened, the motor is dynamically braked due to the short circuit provided by resistors 15 and 16.

Referring now to the entire control system illustrated in the drawing, when the parts are in the positions shown in Fig. 1, the motor is deenergized since switch arm 18 is in engagement with contact 19 and the contact finger 22, aligned with contact 19, is out of engagement with its associated conducting segment 23. But referring to Fig. 1, if the switch arm is moved into engagement with contact 19, current then flows from the source 17 through wire 21, finger 22, segment 23, finger 26, wire 27, brush 14, armature winding 12, brush 14 and resistor 16 back to the source (and also in parallel through resistor 15)—the motor operating in a direction such that disk 24 is rotated in a clockwise direction, its rotation being checked when the motor circuit is interrupted by disengagement of segment 23 from finger 22, the motor and disk continuing to move under their own momentum until disk arm 34 engages the stop member 35; the parts then being in the positions shown in Fig. 2. If the switch arm is now returned to contact 20, the motor is operated in a reverse direction—its energizing circuit then being through finger 29, segment 30 and finger 31—so that the parts reassume the positions shown in Fig. 1.

Inasmuch as dynamic braking of the motor (as described hereinbefore) becomes effective when contact finger 22 or 29 is released from its associated segment, rotation of the disk is quickly arrested. The stop means 34—35 are obviously not essential and have been included merely to facilitate understanding of the figures of the drawing.

It will be observed that, by the complete arrangement shown and described, the system can be reversed substantially at any time after its operation is initiated by the manual switch, i. e., as soon as contact finger 22 or 29 engages its associated segment, since the circuits between the armature winding and contacts 19 and 20 are then complete. This is of especial importance in connection with, for example, the control of fuel valves for aircraft, as referred to in the statement of this invention. In such a control system, the valve or other control device can, if desired, be quickly stopped (due to the dynamic braking effect described) at any intermediate position of operation merely by opening the manual switch.

This embodiment of the invention herein shown and described is obviously susceptible of modification without departing from the spirit of the invention, and I intend therefore to be limited only by the scope of the appended claims.

I claim as my invention:

1. In a motor control system: a direct-current motor comprising an armature winding, means providing a constant unidirectional field for said winding, a source of direct current, a pair of resistors connected respectively to each of the ends of said winding and in common to one terminal of said source, and switching mechanism for connecting the other terminal of said source selectively to one or the other end of said winding so that current can flow through the winding in corresponding opposite directions, said switching mechanism being so constructed and arranged that said other source-terminal is normally disconnected from said winding.

2. A motor control system, as defined in claim 1, wherein the values of said resistors are such that thereby effective dynamic braking of the motor is effected when said winding is disconnected from said source.

3. A motor control system, as defined in claim 1, wherein said resistors are of a material having a high positive temperature coefficient of resistance and are so constructed and arranged that they are materially altered to a substantial degree by passage of the current.

4. In a motor control system: a direct-current motor comprising a rotatable armature winding, a permanent magnet providing a field for said winding, a source of direct current, a pair of resistors connected respectively to each of the ends of said winding and in common to one terminal of said source, and switching mechanism including a single-pole double-throw switch for connecting the other terminal of said source selectively to one or the other end of said winding so that current can flow through the winding in corresponding opposite directions, said switching mechanism being so constructed and arranged that said other source-terminal is normally disconnected from said winding, the values of said resistors being such that effective braking of the motor is effected when said winding is disconnected from said source.

5. In a motor control system: a direct-current motor comprising a rotatable armature winding; means providing a constant unidirectional field for said winding; a source of direct current; a pair of resistors connected respectively to each of the ends of said winding and in common to one terminal of said source; a switch for connecting the other terminal of said source selectively to one or the other end of said winding so that current can flow through the winding in corresponding opposite directions; and means, controlled by the rotation of said winding in response to operation of said switch, for interrupting flow of current through the winding upon a predetermined amount of rotation thereof.

6. In a motor control system: a direct-current motor comprising a rotatable armature winding; means providing a constant unidirectional field for said winding; a source of direct current; a pair of resistors connected respectively to each of the ends of said winding and in common to one terminal of said source; a switch for connecting the other terminal of said source selectively to one or the other end of said winding so that current can flow through the winding in corresponding opposite directions; and means, controlled by the rotation of said winding in response to operation of said switch, for maintaining flow of current through the winding during a predetermined amount of rotation thereof and for then interrupting said flow; said circuit-maintaining means being so arranged that operation of said switch to an opposite position while said winding is energized effects reversal of current flow therethrough.

7. In a motor control system: a direct-current motor comprising a rotatable armature winding; means providing a constant unidirectional field for said winding; a source of direct curent; a pair of resistors connected respectively to each of the ends of said winding and in common to one terminal of said source; a switch for connecting the other terminal of said source selectively to one or the other end of said winding so that current can flow through the winding in corresponding opposite directions; and means, operated at reduced speed by the rotation of said winding in response to operation of said switch, for maintaining flow of current through the winding during a predetermined amount of rotation thereof and for then interrupting said flow; said circuit-maintaining means comprising a pair of conducting means capable of effecting interconnection of said switch with the individual ends of the winding during said predetermined amount of rotation of the winding.

WILLIAM A. RAY.

REFERENCES CITED

The following references are of record in the file of this patent:

UNITED STATES PATENTS

| Number | Name | Date |
|---|---|---|
| 1,078,815 | Wiegand | Nov. 18, 1913 |
| 1,359,333 | Cowles | Nov. 16, 1920 |
| 1,898,242 | Chandler | Feb. 21, 1933 |
| 2,180,205 | Hodgman | Nov. 14, 1939 |
| 435,899 | Johnson | Sept. 2, 1890 |
| 967,210 | Lewis | Aug. 16, 1910 |
| 1,455,618 | James | May 15, 1923 |
| 1,555,071 | Parvin | Sept. 29, 1925 |

FOREIGN PATENTS

| Number | Country | Date |
|---|---|---|
| 20,539 | Great Britain | 1902 |